United States Patent
Cumming

(10) Patent No.: US 6,912,977 B2
(45) Date of Patent: Jul. 5, 2005

(54) HYDROGEN ASSISTED COMBUSTION

(75) Inventor: Hamish Mackenzie Cumming, Darlington (AU)

(73) Assignee: H.A.C. Technologies Pty Ltd, Keyborough (AU)

( * ) Notice: Subject to any disclaimer, the term of this patent is extended or adjusted under 35 U.S.C. 154(b) by 0 days.

(21) Appl. No.: 10/432,694

(22) PCT Filed: Nov. 27, 2001

(86) PCT No.: PCT/AU01/01537

§ 371 (c)(1), (2), (4) Date: May 27, 2003

(87) PCT Pub. No.: WO02/42621

PCT Pub. Date: May 30, 2002

(65) Prior Publication Data

US 2004/0025809 A1 Feb. 12, 2004

(30) Foreign Application Priority Data

Nov. 27, 2000 (AU) .............................. PR1695

(51) Int. Cl.⁷ ............................................... F02B 63/00
(52) U.S. Cl. ......................... 123/3; 123/25 E; 123/25 F
(58) Field of Search ............................ 123/25 A, 25 B, 123/25 E, 25 R, 1 A, 3, 25 F

(56) References Cited

U.S. PATENT DOCUMENTS

| 3,983,882 A | 10/1976 | Billings |
| 4,141,323 A | * 2/1979 | Hart .......................... 123/25 B |
| 4,167,919 A | 9/1979 | Woolley et al. |

FOREIGN PATENT DOCUMENTS

| DE | 2748996 | 5/1979 |
| WO | WO 92/08046 | 5/1992 |

* cited by examiner

Primary Examiner—Andrew M. Dolinar
Assistant Examiner—Katrina B. Harris
(74) Attorney, Agent, or Firm—Ryan Kromholz & Manion, S.C.

(57) ABSTRACT

An apparatus for feeding hydrogen into an intake (11) of an engine (1), including: an air inlet (23); a hydrogen inlet (21); a mixing chamber (20) for generating a fuel mixture from hydrogen and air introduced from the inlets, the chamber being adapted to couple to the intake of the engine, for introducing the fuel mixture thereto; and control means (26) for controlling airflow through the mixing chamber. The control means may include an air speed control for varying an effective cross-section of air flow through the apparatus. The air speed control is preferably in the form of an annular collar arranged in the chamber for radial expansion or contraction.

27 Claims, 4 Drawing Sheets

HYDROGEN ASSISTED COMBUSTION

FIELD OF THE INVENTION

The present invention relates to hydrogen assisted combustion particularly, but not exclusively, for a diesel engine.

BACKGROUND OF THE INVENTION

It is known to use hydrogen as a fuel additive in internal combustion engines, however, relatively little work appears to have been carried out on application of hydrogen assisted combustion to compression ignition engines such as diesel engines.

OBJECT OF THE INVENTION

The present invention seeks to provide an apparatus suitable for achieving workable hydrogen assisted combustion in a diesel engine.

SUMMARY OF THE INVENTION

In accordance with the invention, there is provided an apparatus for feeding hydrogen into an intake of an engine, including:

an air inlet;

a hydrogen inlet;

a mixing chamber for generating a fuel mixture from hydrogen and air introduced from the inlets, the chamber being adapted to couple to the intake of the engine, for introducing the fuel mixture thereto; and control means for controlling airflow through the mixing chamber.

Preferably, the apparatus further includes a water inlet for introducing atomised water into the fuel mixture.

Preferably, the apparatus further includes a temperature control device for controlling temperature of the air passing through the mixing chamber.

Preferably, the apparatus further includes a density control assembly for controlling density of the air entering the mixing chamber. More preferably, the assembly includes a Venturi intake.

The control means preferably includes an air volume control which may be in the form of a butterfly valve, positioned between the chamber and the air inlet.

The control means may also include an air speed control for varying an effective cross-section of air flow through the apparatus. The air speed control is preferably in the form of an annular collar arranged in the chamber for radial expansion or contraction. The annular collar may, for example, be in the form of an expandable bladder.

The chamber preferably includes an annular cage arranged to limit inward expansion of the collar so as to maintain at least a minimum cross-section of air flow through the chamber.

Preferably, the apparatus includes mixing fins to enhance turbulent air flow within the chamber. The mixing fins may be connected to the cage, within the chamber.

Preferably, the apparatus also includes an electrolysis cell or plasma arc or other means for dissociating water into hydrogen and oxygen gas, for introduction into the mixing chamber.

In another aspect, there is provided a combustion ignition engine including an apparatus as described above.

BRIEF DESCRIPTION OF THE DRAWINGS

The invention is more fully described, by way of non-limiting example only, with reference to the accompanying drawings, in which.

DETAILED DESCRIPTION

Figure 1:
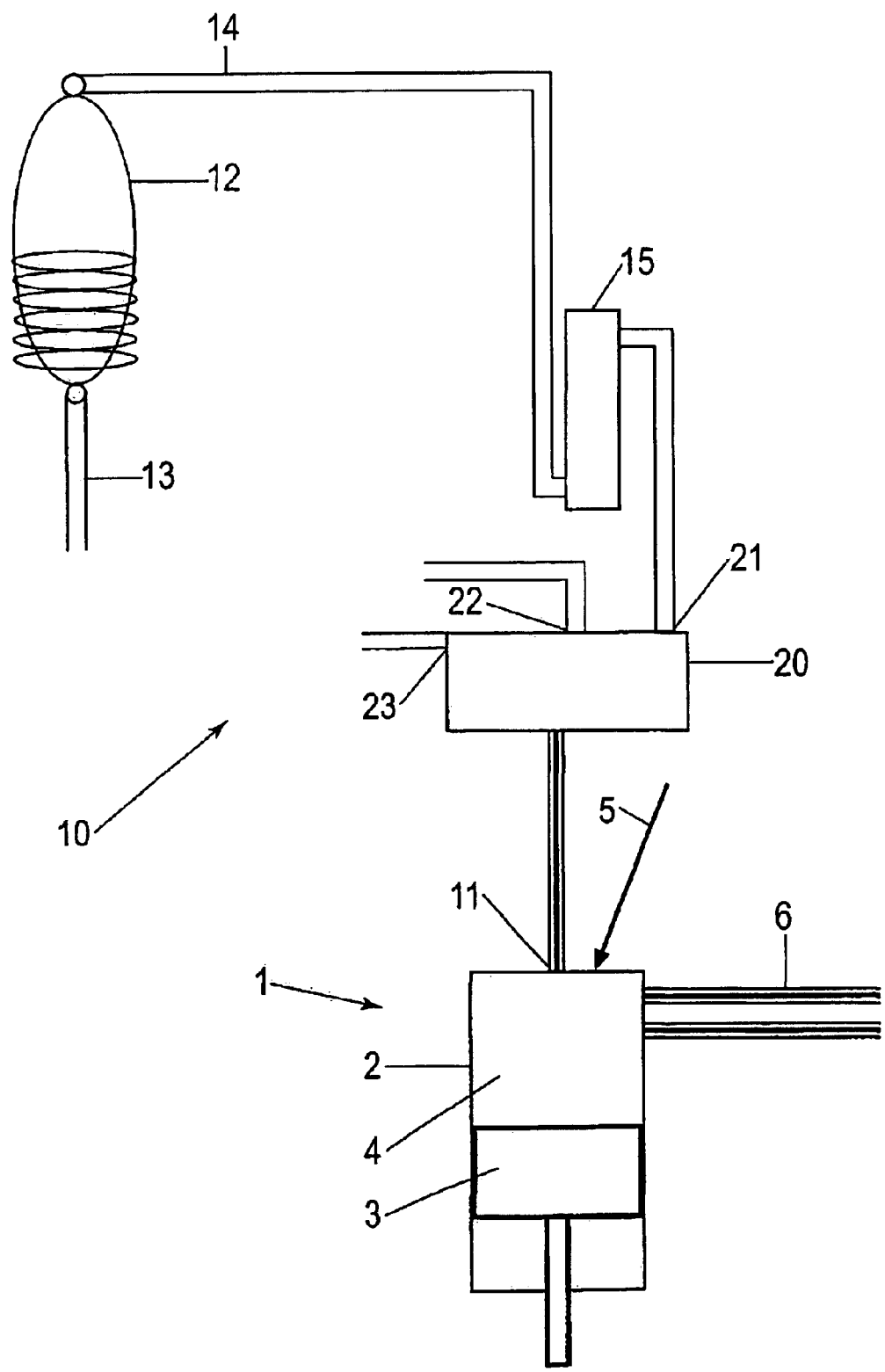
FIG. 1 is a schematic representation of an engine with an apparatus of the invention.
Figure 2:
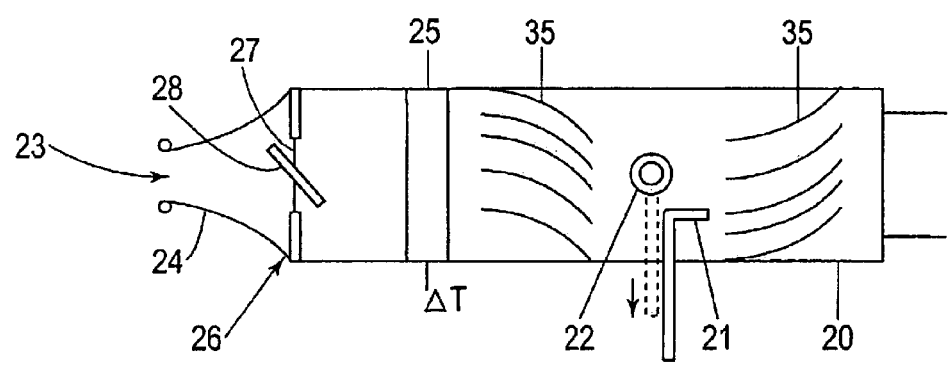
FIG. 2 is a cross-sectional view of the apparatus of FIG. 1.

An engine 1 is schematically represented in FIG. 1 by an engine cylinder 2, which houses a piston 3 and defines a combustion region 4 into which a liquid fuel is injected, as illustrate by arrow 5, for combustion and expansion, to drive the piston, and subsequent exhaust through outlet pipe 6.

Apparatus 10 is coupled to an intake 11 of the cylinder 2 to provide an oxygen/hydrogen fuel mixture to assist in combustion of the liquid fuel. The apparatus 10 includes an electrolysis cell 12 which receives $H_2O$ from a water input 13 for dissociation into constituent gases $H_2$ and $O_2$, which are fed into a feed line 14. The feed line 14 includes a flash back preventer 15, through which the $H_2$ and $O_2$ gases pass to be introduced into a mixing chamber 20 via a hydrogen inlet 21. The mixing chamber 20 is also arranged to receive steam or water, in atomised form, from a water inlet 22 and air from an air inlet 23.

Figure 3:
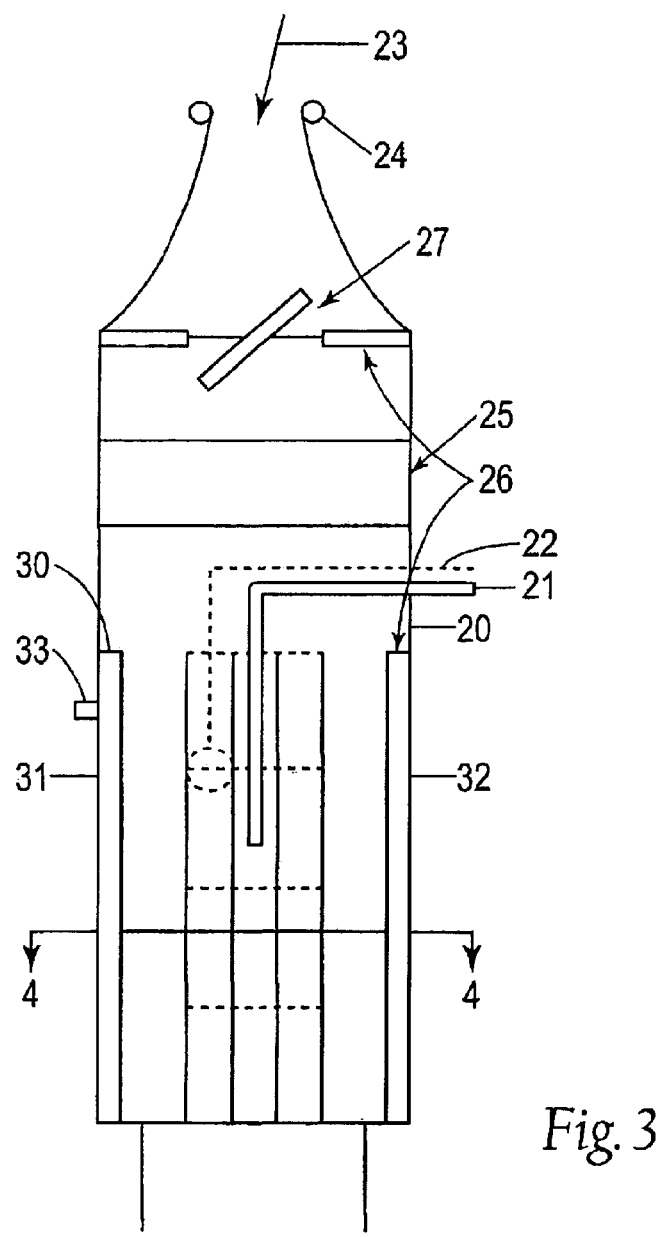
FIG. 3 is a cross-sectional view of the apparatus with a modified chamber construction, shown in a first condition.

A more detailed view of the apparatus 10, excluding the feed line 14, can be seen in FIG. 3. The apparatus is shown as including a density control 24, such as a Venturi intake, a temperature control device 25, such as a reverse-cycle heat exchanger, and control means 26 for controlling air flow through the chamber 20. Mixing fins 35 are also provided to increase turbulence within the chamber and enhance mixing between atomized water and hydrogen from the inlets 22 and 21, respectively, and air traveling through from the air inlet 23.

In the arrangement shown, the control means 26 comprises a volume control 27, in the form of a butterfly valve 28, which allows the total volume of air passing through the mixing chamber to be varied, as engine demand varies. However, the control means 26 may also include an air speed control 30 which is shown in the apparatus of FIGS. 3 to 6, where like parts are denoted with like reference numerals.

Figure 4:
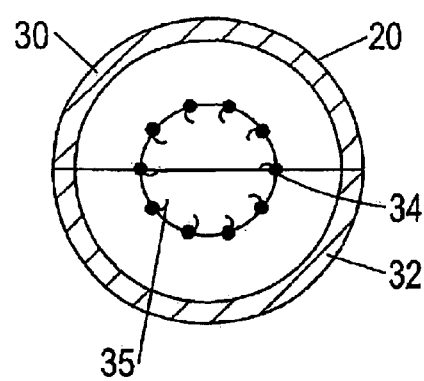
FIG. 4 is a cross-sectional view of the chamber taken along the line a density control assembly for controlling density of the air entering the mixing chamber; shown in FIG. 3.
Figure 5:
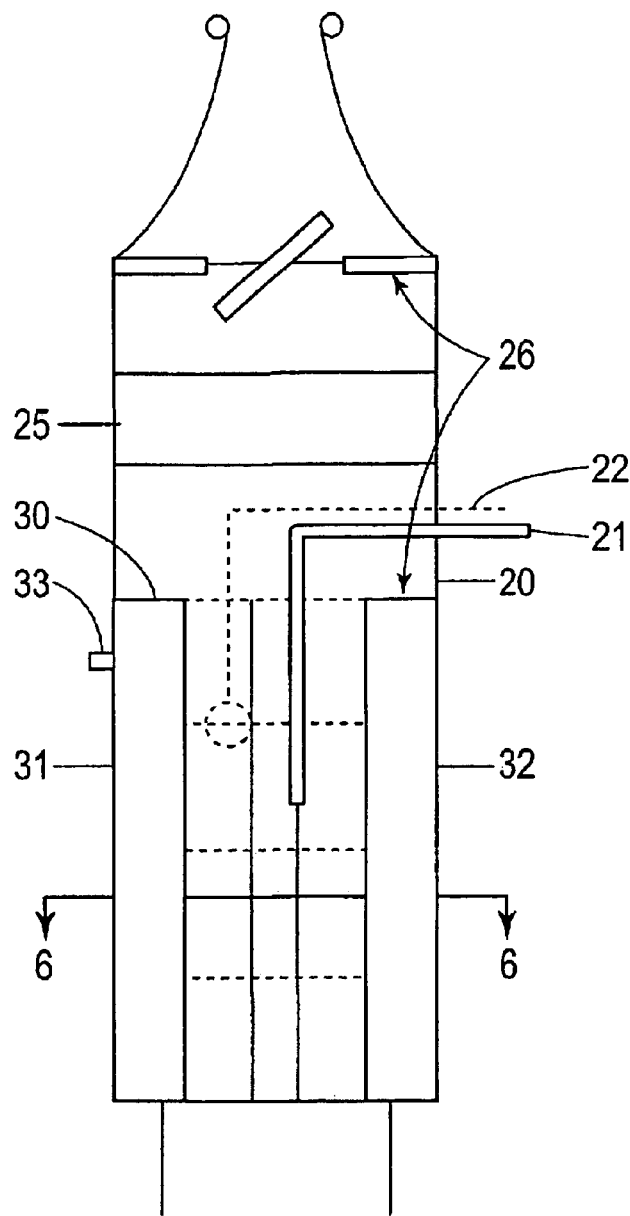
FIG. 5 is a view similar to that of FIG. 3 with the chamber construction shown in a second condition.
Figure 6:
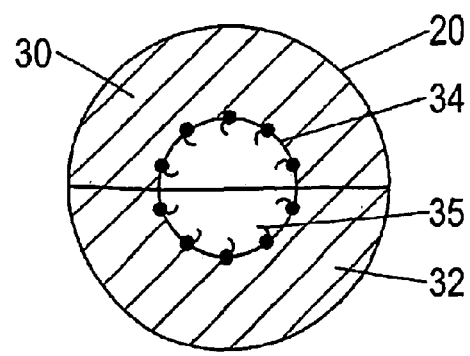
FIG. 6 is a cross-sectional view of the chamber, taken along the line an air volume control, shown in FIG. 5.

The air speed control is in the form of an annular collar 31 which is coaxially housed within the chamber 20 for radial expansion or contraction, so as to vary the cross-section, and thereby the speed, of air flow through the chamber. For that purpose, the collar may be constructed of a bladder 32 which is expandable from a first condition, as shown in FIGS. 3 and 4, to a second, expanded condition as shown in FIGS. 5 and 6. To move from the first to the second condition, the bladder may be coupled to a pressure supply input 33, which may, for example, be controlled by feedback from the engine speed or directly by a velocity measuring probe at a discharge end of the chamber.

The provision of the bladder 32 thereby allows the effective internal diameter of the mixing chamber to maintain an optimum velocity of air through the chamber at all engine speeds. For example, at low engine speeds (rpm) the chamber needs to have a relatively small effective diameter to get a small volume of air, as required by the engine, up to a desired velocity, whereas the chamber needs to have a relatively large diameter to maintain the same air velocity when the air volume required by the engine is much higher. As such, the bladder needs to be inflated during low engine speeds and deflated at high engine speeds. It has been found that varying the effective diameter of the mixer in that manner enables high mixing efficiencies to be maintained such that the amount of hydrogen added to the air flow can be reduced to half or a third that otherwise required, whilst still maintaining a power enhancing effect on the engine to reduce liquid fuel consumption. By way of example, in one experiment it was found that 17% hydrogen by volume of air was required for relatively low air velocity (approximately 15 m/s) in order to reduce the fuel consumption of diesel by 40%. At high velocities, however, (approximately 30 m/s) only 5% hydrogen by volume of air was required to reduce the liquid fuel consumption by 50%.

An annular cage 34 is also provided within the chamber 20 to limit radial expansion of the bladder 32 and ensure at least a minimum cross-section of air flow through the chamber is maintained. Mixing fins 35 project inwardly of the cage 34 so as not to interfere with operation of the bladder 32.

As may be appreciated from the above, the apparatus 10 allows for control of each major parameter to allow for optimisation of volume, speed and mixing ratios of hydrogen, oxygen, water/steam and air passing through the mixing chamber to ensure maximum efficiency in power output of the engine whilst minimising the liquid fuel consumption. A brief description of each of the relevant parameters is as follows:

1. Air Speed.

The effective diameter of the mixing chamber has to be sized to match the engines optimum performance speed. At the optimum speed, the velocity within the mixer has to be such that the particles of water entrained into the airflow from inlet 22 stay in their atomised form, and do not have time to merge with other atomised droplets before being aspirated from the mixing chamber 20 into the engine cylinder 2. The optimum velocity required, from experiments conducted on various engines to date, is in the range of between 15 and 20 meters per second within the mixer. The highest efficiency that has been recorded repeatedly is at 17 m/s. With current testing the engine efficiency rises with velocity up to 17 m/s, then starts to taper off as the velocity continues to increase, to the point where the efficiency of 20 m/s is about that of 15 m/s. As the velocity rises over 20 m/s, the efficiency continues to fall as if the engine is starving for air.

So with the current mixer configuration, the optimum velocity range is between 15 and 20 m/s to premix the atomised water, the hydrogen gas and the oxygen gas. With the same fuel, air, water and gases ratio going through the mixer, there was up to a 70% increase in useable engine output comparing 10 m/s to 17 m/s velocity through the mixer. So less hydrogen is needed to be added to have the same reduction in fuel consumption if the velocity is optimised.

Air speeds outside the above range can also be realised by changing the inner diameter of bladder. For example, for a delivery truck, the normal range of diesel engine speed is from 1000 rpm to 3000 rpm and the effective diameter of the mixer may therefore be adjusted across the rev range. However, for a line-haul truck engine which spends most of its operating life in a fairly narrow rev range, with gear changes taking the speeds up and down, the effective diameter size of the chamber may be set for the higher end of the engine's running speed, with a fuel efficiency compromise at lower speeds or idle. Similarly, for constant speed engines such as generators and pumps, the diameter of the mixing chamber may be sized and fixed to optimise the exact engine speed.

2. Turbulence.

The length of the mixer needs to be sufficient to set up turbulent air flow and will be proportional to the optimised effective diameter of the chamber. The mixing fins are ideally provided both upstream and downstream of the gas and water inlets 21, 22 to enhance the turbulent flow.

3. Air Volume.

The quantity of air passing through the chamber, as controlled by the butterfly valve 28, allows for the engine to be choked, if required, to increase the vacuum on the mixing chamber 20. The valve therefore provides an important function of preventing the engine from overspeeding when load is removed and before a fuel rack has had a chance to respond and reduce the amount of liquid fuel being injected into the cylinder 2. In the absence of the volume control 27, the engine would rapidly accelerate, with no load applied, which would have the potential of damaging the engine.

4. Atomisation of Water.

There are three main advantages derived from adding water to the fuel mix:—1) Stable ignition, no pre-ignition; 2) Lowering of the oxides of nitrogen in the exhaust; and 3) A power increase due to denser combustible gasses. The water introduced into the mixing chamber 20 needs to be atomised in droplets of a specific size that will be readily entrained into the air stream passing through the chamber. If the drops are too large the water will enter the cylinder 2 in liquid form. However, if the drops are too small, they will vaporise or turn into steam before the fuel mixture within the cylinder has ignited. The design of the mixing chamber 20 allows the water droplets to enter an optimum velocity air flow to actually supersaturate the air with an amount of water which is greater than 100% relative humidity. In fact, up to 50% more water can be carried in the air with the present chamber construction. The atomised water in the fuel mixture helps to cool the engine cylinder whilst increasing power output due to expansion of the water upon combustion of the fuel in the cylinder.

In one trial, sufficiently small droplets were produced through a 2 micron nozzle. The mixing of these droplets and the ability to retain them as droplets in the air intake gave far better results than through a 4 micron nozzle for instance. It is envisaged that even smaller droplets may provide a further increase in the engine performance. It has also been found that the addition of 10% methanol in the water further enhances the efficiency of the engine and helps to limit any pre-ignition concerns with the hydrogen gas. Higher amounts of methanol give higher power output, but there is a financial tradeoff.

5. Pressure Control.

The Venturi intake is shaped to increase density of air whilst also taking energy out of it, to thereby reduce its temperature.

6. Temperature Control.

The reverse-cycle heat exchanger further reduces the temperature of the air, if required, in warmer climates, or may be used to increase the temperature of the air in cooler climates. The optimum temperature will depend on the liquid fuel being injected into the engine cylinder.

7. Order of Entry of Ingredients into the Mixer.

Despite the positioning of the water inlet 22, as shown in the drawings, the greatest advantage may be gained through the mixer if the water is supplied in the first third of the mixer to allow for thorough saturation of the air intake prior to the addition of the hydrogen gas in the central point of the mixer. This allows the addition of hydrogen and oxygen to be done in a stable controlled environment without the risk of a premature ignition of the two gasses. This allows for an oxygen saturated environment to exist right up to the point of liquid fuel injection into the engines cylinder.

The entry of the hydrogen and the water saturated intake air slows down the rate of reaction in the cylinder, so we can advance the timing of the engine without fear of pre-ignition to approximately 40 DBTDC. (degrees before top dead centre) This is 20 DBTDC before most direct injection engines. This appears to allow more useful work, and more complete burning of fuel during the power stroke of the engine, because the engine again uses less liquid fuel to perform the same task.

Apart from the increased engine performance, and associated reduction in fuel consumption that the addition of hydrogen, oxygen and water gives the diesel engine, greenhouse gases produced by an engine fitted with the apparatus have been found to be substantially reduced and indeed a net zero green-house gas output may be achieved when diesel fuel is replaced with canola oil, or the like.

The above described apparatus has been described with specific reference to application to a compression ignition engine, such as a diesel engine, however it should be appreciated that the apparatus may be equally applicable to any other form of engine. Further, the apparatus has been described by way of example only and many modification and variations may be made thereto without departing from the spirit and scope of the invention as described.

What is claimed is:

1. An apparatus for supplying a hydrogen containing gas mixture for use in hydrogen assisted combustion of an engine, the apparatus comprising:
    an air inlet for admitting air to the apparatus;
    a hydrogen inlet for admitting hydrogen to the apparatus;
    a water inlet for admitting water or a water mixture to the apparatus;
    a mixing chamber in which the hydrogen containing gas mixture is formed from mixing the hydrogen, air and water admitted to the mixing chamber, the chamber being adapted to couple to the intake of the engine for introducing the hydrogen containing gas mixture thereto for hydrogen assisted combustion of the engine; and
    a controller for controlling air flow through the mixing chamber;
    wherein the controller is operated to control the velocity of the air flow to supersaturate the air with the water or the water mixture admitted to the mixing chamber at a level which is up to or greater than about 100% relative humidity such that the air admitted to the chamber is supersaturated with water or the water mixture prior to the air mixing with the hydrogen to form the hydrogen containing gas mixture thereby increasing the power developed by the engine when the hydrogen containing gas mixture from the mixing chamber is admitted to the engine.

2. An apparatus as claimed in claim 1 wherein the water or water mixture contains an additive or mixture of one more additives.

3. An apparatus as claimed in claim 2 wherein the additive is methanol or other additive including mixtures of additives containing methanol.

4. An apparatus as claimed in claim 3 wherein water or the mixture of water and methanol is introduced into the mixing chamber through the water inlet.

5. An apparatus as claimed in claim 4 wherein the water inlet is for introducing atomised water or an atomised mixture containing water.

6. An apparatus as claimed in claim 1, further comprising a temperature control device for controlling temperature of the air passing through the mixing chamber.

7. An apparatus as claimed in claim 1, further comprising a density controlling assembly for controlling density of the air entering the mixing chamber.

8. An apparatus as claimed in claim 7 wherein the density control assembly includes a venturi intake.

9. An apparatus as claimed in claim 1 wherein the controller is or includes an air volume control.

10. An apparatus as claimed in claim 1 wherein the air volume control is in the form of a butterfly valve, positioned between the air inlet and the mixing chamber.

11. An apparatus as claimed in claim 1 wherein the air flow controller includes an air speed controller for varying the effective cross-section of air flow through the apparatus.

12. An apparatus as claimed in claim 11 wherein the air speed control is in the form of an annular collar arranged in the chamber for radial expansion or contraction.

13. An apparatus as claimed in claim 12 wherein the collar is in the form of an expandable bladder.

14. An apparatus as claimed in claim 12 wherein the chamber includes an annular cage arranged to limit inward expansion of the collar so as to maintain at least a minimum cross-section of the air flow through the chamber.

15. An apparatus according to claim 1 wherein the mixing chamber is provided with mixing fins to enhance turbulent air flow within the mixing chamber.

16. An apparatus as claimed in claim 1 wherein the hydrogen is thoroughly or uniformly mixed into the air flow after the air is mixed with the water or water mixture so that the hydrogen containing gas mixture does not separate into components prior to being admitted to the engine.

17. An apparatus as claimed in claim 1, further comprising,
    an electrolysis cell, reformation system, plasma device or other device for dissociating water into hydrogen and oxygen gases for introduction into the mixing chamber.

18. An apparatus as claimed in 13 wherein the bladder is inflated during low engine speeds and deflated at high engine speeds.

19. An apparatus as claimed in claim 1 wherein the optimum velocity of air flow within the mixing chamber is from 15–20 meters per second.

20. An apparatus as claimed in claim 1 wherein up to 50% more water is carried by the air flow to increase the relative humidity to greater than 100%.

21. An apparatus as claimed in claim 5 wherein the water is atomised through a 2 micron nozzle.

22. An apparatus as claimed in claim 3 wherein the methanol is added to the water to further increase the efficiency of the engine.

23. An apparatus according to claim 1 wherein the water or water mixture is introduced into the first third of the mixing chamber for permitting saturation of the air prior to the addition of the hydrogen to the mixing chamber.

24. An apparatus as claimed in claim 1 fitted to, mounted on or associated with an engine so that the engine can be tuned so that the ignition of the can be advanced up to 40° DBTDC.

25. An engine having an apparatus according to claim 1.

26. An engine as in claim 25. wherein the engine is a compression ignition engine or a spark ignition engine.

27. An engine as in claim 25 wherein the engine is a diesel engine, an internal combustion engine, a petrol engine, a rotary engine or a rankin engine.

\* \* \* \* \*